US008353110B2

(12) United States Patent
Galster

(10) Patent No.: US 8,353,110 B2
(45) Date of Patent: Jan. 15, 2013

(54) MOTORIZED SAW AND CLAMPING ELEMENT

(75) Inventor: Werner Galster, Aspach (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 733 days.

(21) Appl. No.: 12/167,340

(22) Filed: Jul. 3, 2008

(65) Prior Publication Data

US 2009/0007748 A1 Jan. 8, 2009

(30) Foreign Application Priority Data

Jul. 5, 2007 (DE) ......................... 10 2007 031 337

(51) Int. Cl.
*B23D 57/02* (2006.01)
*B27B 17/00* (2006.01)
*B25G 3/20* (2006.01)
*F16B 2/00* (2006.01)

(52) U.S. Cl. ......................................... 30/381; 403/371

(58) Field of Classification Search ............ 30/381–386; 411/538–539; 403/366–371
See application file for complete search history.

(56) References Cited

U.S. PATENT DOCUMENTS

| | | | | | |
|---|---|---|---|---|---|
| 1,949,612 | A * | 3/1934 | Mattair et al. | .................. | 92/159 |
| 2,236,370 | A * | 3/1941 | Jackman | ........................ | 277/531 |
| 3,280,650 | A * | 10/1966 | Clement | ......................... | 74/339 |
| 3,857,179 | A * | 12/1974 | Haupt et al. | ..................... | 30/381 |
| 3,926,237 | A * | 12/1975 | Enders | .......................... | 411/135 |
| 4,243,339 | A * | 1/1981 | Dickerson | ......................... | 403/4 |
| 4,488,595 | A * | 12/1984 | Akkerman | .................... | 166/206 |
| RE33,827 | E * | 2/1992 | Terry | ............................ | 411/149 |
| 5,104,141 | A * | 4/1992 | Grove et al. | ............. | 280/86.753 |
| 5,353,506 | A * | 10/1994 | Muller et al. | ................... | 30/386 |
| 5,491,899 | A * | 2/1996 | Schliemann et al. | ........... | 30/386 |
| 6,182,992 | B1 * | 2/2001 | Garven, Jr. | ................. | 280/250.1 |
| 6,944,957 | B2 * | 9/2005 | Donnerdal et al. | ............. | 30/386 |

FOREIGN PATENT DOCUMENTS

DE 41 42 751 C1 12/1992

* cited by examiner

*Primary Examiner* — Ghassem Alie
*Assistant Examiner* — Bharat C Patel
(74) *Attorney, Agent, or Firm* — Foley & Lardner LLP

(57) ABSTRACT

A motorized saw has a guide rail which is arranged on at least one clamping stud and can be clamped in place between two bearing surfaces by clamping means. A clamping element is provided which is arranged on the clamping stud and in a locating opening of the guide rail and which fixes the guide rail in at least one radial direction of the clamping stud in the clamped state. A clamping element has at least one clamping surface which is formed at an end face of the clamping element and which encloses an angle of less than 90° with the longitudinal center axis of an opening of the clamping element.

16 Claims, 4 Drawing Sheets

MOTORIZED SAW AND CLAMPING ELEMENT

CROSS-REFERENCE TO RELATED PATENT APPLICATIONS

The right of foreign priority is claimed under 35 U.S.C. §119(a) based on Federal Republic of Germany Application No. DE 10 2007 031 337.5, filed Jul. 5, 2007, the entire contents of which, including the specification, drawings, claims and abstract, are incorporated herein by reference.

BACKGROUND OF THE INVENTION

The invention relates to a motorized saw of the generic type specified in the preamble of claim 1 and to a clamping element, in particular for fixing the guide rail of a motorized saw on a clamping stud.

DE 41 42 751 C1 discloses a motorized saw whose guide rail is arranged on clamping studs and is clamped in place between a bearing plate of the housing and the sprocket cover. In addition, means for the axial locking of the guide rail on the clamping studs before the fixing of the sprocket cover are provided.

In known motorized saws, there is a distance between the clamping studs and the locating opening of the guide rail, such that the guide rail can be readily put onto the clamping studs. The guide rail is fixed solely by clamping forces.

SUMMARY OF THE INVENTION

The object of the invention is to provide a motorized saw of the generic type in which effective fixing of the guide rail is achieved in a simple manner. A further object of the invention is to provide a clamping element which fixes the guide rail of a motorized saw on a clamping stud in an effective manner.

This object is achieved by a motorized saw having the features of claim 1. With regard to the clamping element, the object is achieved by a clamping element having the features of claim 13.

The clamping element permits additional fixing of the guide rail in the radial direction of the clamping stud. As a result, the forces acting on the guide rail during operation can be absorbed more effectively and introduced directly via the clamping stud into the housing.

The clamping element advantageously has an opening which passes through the clamping element and in which the clamping stud is arranged. The clamping element has in particular at least one clamping surface which is in operative connection with a bearing surface in the clamped state of the guide rail. The clamping surface encloses an angle of less than 90° with the center axis of the opening of the clamping element. The bearing surface is therefore inclined relative to the center axis of the opening of the clamping element. The inclination of the clamping surface causes the clamping element to tilt during tightening of the clamping means. Due to the tilting, a radial clamping force can be exerted on the guide rail. At the same time, the outside diameter of the clamping element can be smaller than the height of the locating opening of the guide rail, such that the guide rail can be fitted on the clamping element in a simple manner. Provision may be made for the clamping surface, when the clamping means is not fixed, to enclose an angle of more than 0° with a bearing surface. Due to the angle of more than 0° between the two surfaces, tilting of the clamping element is achieved during the tightening of the clamping means.

In order to achieve sufficient tilting for fixing the guide rail, provision is made for every inside diameter of the opening to be larger than an associated outside diameter of the clamping stud, and for the height of the locating opening of the guide rail in the region of the clamping element to be larger than an associated outside diameter of the clamping element. In this case, the opening and the outer circumference of the clamping stud need not be designed to be circular; however, the difference in the diameters advantageously exists in every circumferential region.

Means for locking the rotary position of the clamping element on the clamping stud are advantageously provided. In particular in the case of planar clamping and bearing surfaces, the clamping force can only be exerted in one defined direction. The means for locking the rotary position ensures that the clamping force is exerted in the direction in which the guide rail is to be fixed. The means advantageously effect positive locking of the rotary position. A position locking element is expediently provided which interacts with the clamping element and the clamping stud. This results in a simple design. However, provision may also be made for the cross sections of the opening of the clamping element and of the outside diameters of the clamping stud to be adapted to one another and to effect positive positional locking. As a result, additional components for positional locking can be dispensed with.

The clamping stud advantageously has a collar as captive locking means for the clamping element. As a result, unintentional removal of the clamping element from the clamping stud is avoided. To compensate for tolerances, an elastic element may be arranged between guide rail and clamping element. The elastic element is in this case held in particular on the guide rail or on the clamping element, such that the position of the elastic element is secured and loss of the elastic element is avoided. However, provision may also be made for an elastic element to be arranged between the clamping stud and the clamping element, in particular for the compensation of tolerances. An elastic element arranged in this way has a comparatively long service life.

The clamping element advantageously has a plurality of slots which extend in each case over part of the width of the clamping element and which subdivide the clamping element into segments. In this case, in particular at least two segments interact with a bearing surface. The subdivision of the clamping element into segments enables the segments to expand radially outward, such that clamping forces can be applied over the entire circumference of the clamping element. As a result, positional locking of the clamping element can be dispensed with. In order to enable the segments to expand radially outward, provision is made in particular for the bearing surface to be of conical design.

For a clamping element which in particular serves for fixing the guide rail of a motorized saw on a clamping stud, having an opening which has a longitudinal center axis, and having at least one clamping surface which is formed at an end face of the clamping element, provision is made for the clamping surface to enclose an angle of less than 90° with the longitudinal center axis of the opening.

The angle between the clamping surface and the longitudinal center axis of the opening permits tilting of the clamping element or of a segment of the clamping element relative to a clamping stud on which the clamping element is arranged, such that radial clamping forces can be exerted. The clamping elements may in this case also be used for fixing other components, for example other components of portable implements. Other intended uses in which radial clamping forces are to be exerted for fixing a component may also be envisaged.

Provision is made for the clamping element to have two clamping surfaces, running parallel to one another, at its end faces. In particular, the angle between a clamping surface and the longitudinal center axis of the opening is more than about 85°. An angle of about 87° to about 88° is considered to be especially advantageous.

The clamping element advantageously has at least one slot. The slot advantageously runs inclined relative to the center axis of the opening and extends over the entire width of the clamping element. However, a plurality of slots may also be provided which extend in each case over part of the width of the clamping element and which subdivide the clamping element into segments. The subdivision of the clamping element into segments enables the segments to expand radially outward, such that clamping forces can be exerted in different radial directions. The angle between the clamping surface and the longitudinal center axis of the opening in a clamping element which is subdivided into segments is advantageously about 20° up to about 60°.

Further objects, features and advantages of the present invention will become apparent from the detailed description of preferred embodiments that follows, when considered together with the accompanying figures of drawing.

BRIEF DESCRIPTION OF THE DRAWINGS

Exemplary embodiments of the invention are explained below with reference to the drawing, in which.

DETAILED DESCRIPTION OF THE PREFERRED EMBODIMENTS

Figure 1:
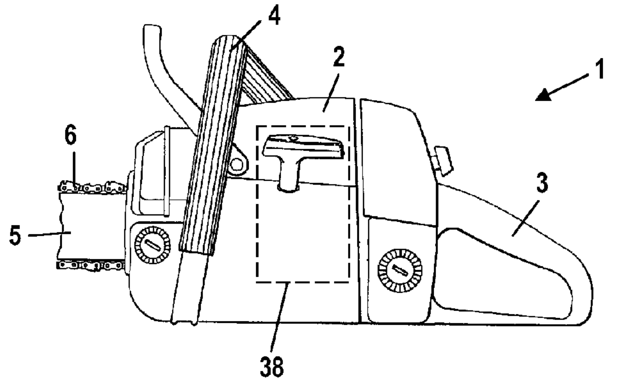
FIG. 1 shows a schematic illustration of a motorized saw in side view.

The motorized saw 1 shown in FIG. 1 shows a housing 2, on which a rear handle 3 and a handle tube 4 for guiding the motorized saw 1 are arranged. A guide rail 5 projects forward on the side of the housing 2 opposite the rear handle 3. Arranged on the guide rail 5 in a revolving manner is a saw chain 6, which is driven by a drive motor 38 arranged in the housing 2. The drive motor is in particular an internal combustion engine. A clamping element according to the invention can be used in all types of motorized saws, that is to say in all implements in which a saw chain 6 is driven in a revolving manner about a guide rail 5. This also includes, for example, pole pruners or the like. Use for securing other components may also be advantageous.

Figure 2:
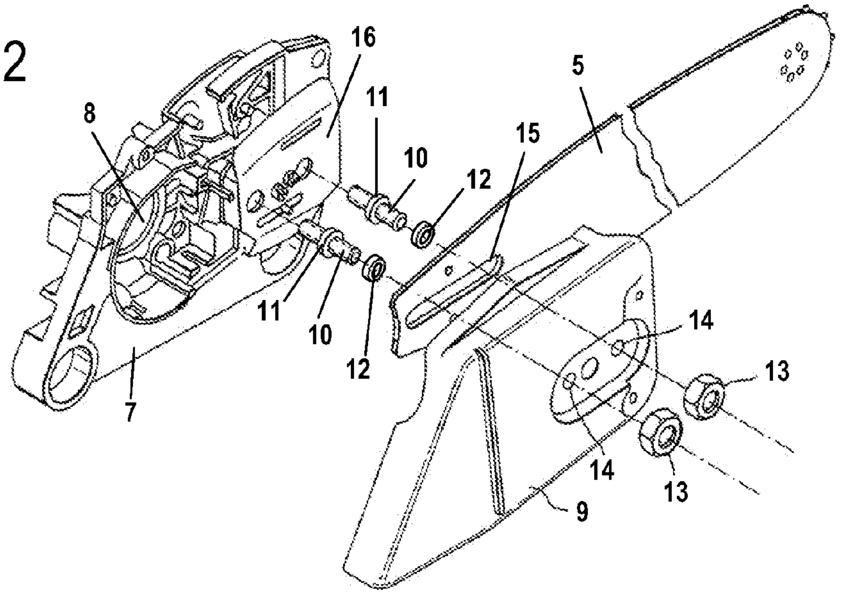
FIG. 2 shows an exploded illustration of a motorized saw in the region of the fastening of the guide rail.

FIG. 2 shows a housing wall 7 of the housing 2, said housing wall 7 having an opening 8 for a drive shaft (not shown) of the drive motor. The drive shaft projects through the opening 8 and drives a pinion (not shown) of the saw chain 6. Formed on the housing wall 7 is a bearing surface 16, against which the guide rail 5 bears. Two clamping studs 10 are screwed into the housing 2. The clamping studs 10 each have two threaded sections, which are separated from one another by an encircling collar 11. The section facing the housing 2 is screwed into the housing 2. The guide rail 5 is fixed to the sections projecting outward. For fixing on the clamping studs 10, the guide rail 5 has a locating opening 15 which is designed as an elongated hole. A sprocket cover 9 which has two openings 14 for the clamping studs 10 is provided for the fixing. The sprocket cover 9 is secured to the clamping studs 10 by two clamping nuts 13. As a result, the guide rail 5 is clamped in place between the bearing surface 16 and the sprocket cover 9. Clamping elements 12 which are arranged on the clamping studs 10 in the region of the locating opening 15 are provided for the additional fixing of the guide rail 5 in the radial direction.

Figure 3:
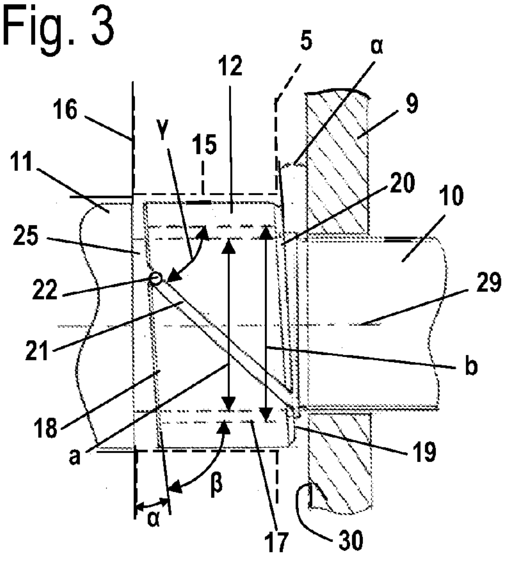
FIG. 3 shows a schematic sectional illustration of a clamping stud with clamping element arranged thereon.
Figure 4:
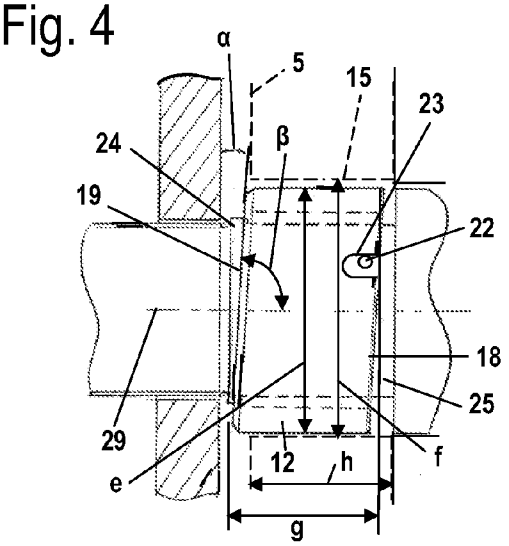
FIG. 4 shows the clamping stud and the clamping element from FIG. 3 in a partly sectioned illustration from the opposite side.

In FIGS. 3 and 4, a clamping element 12 is shown on a clamping stud 10 between the bearing surface 16 and the sprocket cover 9. As FIG. 3 shows, the collar 11 is screwed into the housing wall 7 to such an extent that the collar 11 terminates flush with the bearing surface 16. The clamping stud 10 has a support section 25, which is defined by the collar 11 and by a second collar 24 shown in FIG. 4 and on which the clamping element 12 is arranged. For this purpose, the clamping element 12 has an opening 17 which is designed as a bore and which has a longitudinal center axis 29 which coincides with the longitudinal center axis of the clamping stud 10 in the unclamped state shown in FIGS. 3 and 4.

The clamping element 12 is held with radial clearance on the support section 25. The outside diameter a of the support section 25 is slightly smaller than the inside diameter b of the opening 17 of the clamping element 12. The clamping element 12 has a slot 21, which extends over the entire width of the clamping element 12. As a result, the clamping element 12 of sleeve-shaped design can be slightly expanded or compressed. The second collar 24 shown schematically in FIGS. 3 and 4 advantageously has an outside diameter which is larger than the inside diameter b of the opening 17. As a result, the second collar 24 acts as a captive locking means, over which the clamping element 12 cannot slip unintentionally. To fit or remove the clamping element 12, the clamping element 12 must be expanded and pushed over the second collar 24.

The slot 21 is inclined relative to the longitudinal center axis 29 of the opening 17 by an angle $\gamma$ which is advantageously about 30° up to about 60°. Projecting into the slot 21 is a pin 22 which is secured to the support section 25. The pin 22 advantageously projects through the support section 25. As FIG. 4 shows, a groove 23, into which the pin 22 projects, is provided on the opposite side of the clamping element 12. On account of the inclination of the slot 21, the clamping element 12 rotates relative to the support section 25 during the displacement of the clamping element 12 in the direction of the longitudinal center axis 29. In order to allow this relative rotation, the width of the groove 23 as measured in the circumferential direction is greater than the diameter of the pin 22. The pin 22 establishes the rotary position of the clamping element 12 on the clamping stud 10. The rotary position of the clamping element 12 is obtained in the clamped state on account of the bearing of the clamping element 12 against the bearing surface 16 due to the position of the pin 22.

The clamping element 12 has a first clamping surface 18 which is adjacent to the bearing surface 16 and a second clamping surface 19 which is arranged on the opposite side of the clamping element 12 and is adjacent to a bearing surface 30 formed on the sprocket cover 9. The two clamping surfaces 18 and 19 run parallel to one another and are inclined relative to the longitudinal center axis 29 of the opening 17 by an angle β. In FIG. 3, for the sake of clarity, the angle β is depicted relative to the wall of the opening 17. Since the wall of the opening 17 runs in a planar manner and parallel relative to the longitudinal center axis 29, the same angle is obtained here. The angle β is less than 90°. The angle β is advantageously greater than about 85°. In particular, the angle β is about 87° to about 88°. The first clamping surface 18 is inclined relative to the bearing surface 16 by an angle α. The angle α together with the angle β produces 90°. Accordingly, the second clamping surface 19 is inclined relative to the bearing surface 30 of the sprocket cover 9 by an angle α. In order to make it easier to put the guide rail 5 onto the clamping element 12, the clamping element 12 has a bevel 20 on the end face facing the sprocket cover 9.

As FIG. 4 shows, the clamping element 12 also has clearance relative to the locating opening 15 of the guide rail 5. The outside diameter e of the clamping element 12 is smaller than the height f of the locating opening 15 as measured perpendicularly to the longitudinal direction of the guide rail 5. As FIG. 4 also shows, the clamping element 12, in the unclamped state, has a width g which is measured parallel to the longitudinal center axis 29 and which is somewhat larger than the width h of the guide rail 5 as measured perpendicularly to the surface of the guide rail 5.

Figure 5:
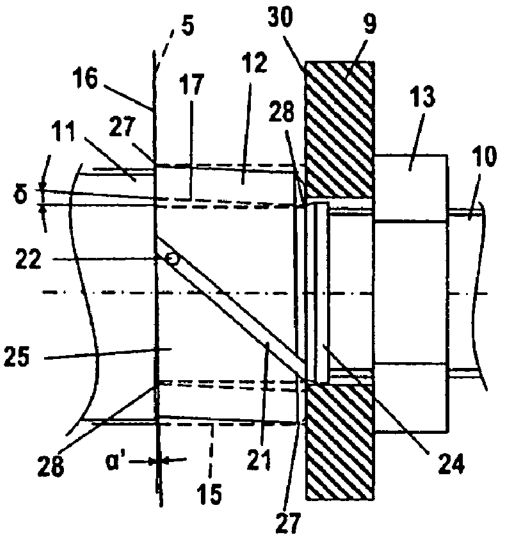
FIG. 5 shows the clamping stud and the clamping element from FIG. 3 in the clamped state of the guide rail.

In FIG. 5, the clamping element 12 is shown schematically in the clamped state of the guide rail 5. The guide rail 5 lies between the bearing surfaces 16 and 30 and is clamped in place between them. When the guide rail 5 is being clamped in place, the clamping element 12 is first of all pressed against the bearing surface 16. As soon as the clamping element 12 bears against the bearing surface 16 and against the bearing surface 30, the clamping element 12 is tilted by the angle δ shown in FIG. 5 until the guide rail 5 bears against the bearing surfaces 16 and 30 and is clamped in place between them. In this state, the clamping element 12 bears with two outer clamping points 27 against the locating opening 15 of the guide rail 5 and against a respective bearing surface 16, 30. On the sides of the opening 17 which are in each case opposite the outer clamping points 27, the clamping element 12 bears with inner clamping points 28 against the support section 25. As a result, the clamping element 12 clamps the guide rail 5 in position on the support section 25 in the radial direction. A movement of the guide rail 5 in this radial direction, in which the clamping forces are applied, is no longer possible. As a result, additional fixing of the guide rail 5 is achieved. As FIG. 5 shows, the angle α has decreased to an angle α' which is advantageously greater than 0°. The angle α' corresponds to the difference between the angle α and the angle δ. In order to obtain a larger bearing surface of the clamping element 12 against the guide rail 5 and/or against the support section 25, corresponding flats may be provided at the outside diameter or at the opening 17 of the clamping element 12, such that linear bearing is obtained.

Figure 6:
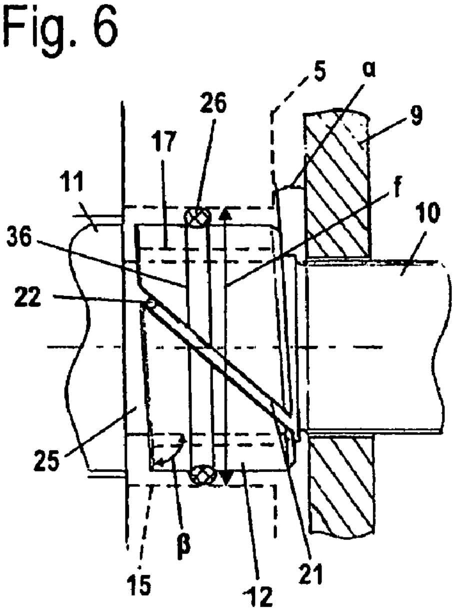
FIG. 6 shows an exemplary embodiment of the arrangement from FIG. 3, FIGS. 7 and 8 show schematic illustrations of exemplary embodiments of clamping elements and clamping studs.

Shown in FIG. 6 is an exemplary embodiment whose clamping element 12 corresponds to the clamping element 12 shown in FIGS. 3 to 5. In the exemplary embodiment according to FIG. 6, the height f of the locating opening 15 is larger than in the exemplary embodiment according to FIGS. 3 to 5. An elastic element 26, which may be designed, for example, as a sealing ring, is arranged between the clamping element 12 and the locating opening 15. The elastic element 26 compensates for tolerances between the clamping element 12 and the guide rail 5. On account of the elastic element 26, preliminary fixing of the guide rail 5 is already achieved when the guide rail 5 is pushed onto the clamping stud 10. In the clamped state, the clamping element 12 is advantageously directly supported on the locating opening 15 of the guide rail 5. However, provision may also be made for the elastic element 26 to also be arranged in the clamped state between the clamping element 12 and the guide rail 5, such that pliant clamping of the guide rail 5 is obtained. At its outer circumference, the clamping element 12 has an encircling groove 36 in which the elastic element 26 is held. However, the elastic element 26 may also be held in the guide rail 5.

Figure 7:
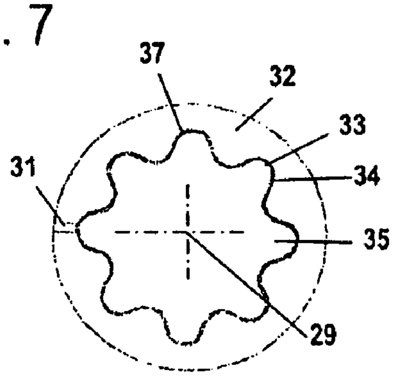
Figure 8:
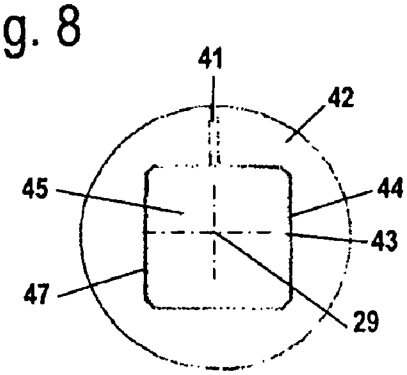
Figure 9:
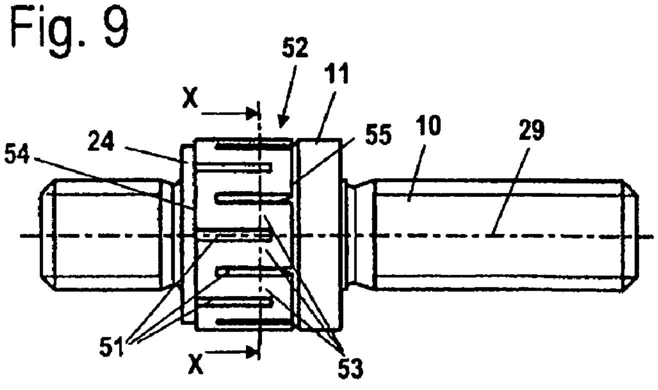
FIG. 9 shows a side view of a clamping stud with clamping element arranged thereon.

FIGS. 7 and 8 show exemplary embodiments of clamping elements 32 and 42 which essentially correspond to the clamping element 12. In the case of the clamping elements 32 and 34, in contrast to the clamping element 12, positive positional locking is provided in which no additional position locking element such as the pin 22 is required.

As FIG. 7 shows, the clamping element 32 has an inner profile 34 which has a corrugated structure. An associated support section 35 of a clamping stud 10 has an outer profile 33 having a corresponding corrugated profile. The profiles 33 and 34 are in this case dimensioned in such a way that there is clearance between the clamping element 32 and the support section 35, such that the clamping element 32 is slightly movable relative to the support section 35 in the radial direction and tilting of the clamping element 32 relative to the support section 35 is possible. The inner profile 34 of the clamping element 32 defines an opening 37, through which the support section 35 projects. The clamping element 32 has a slot 31 which extends over the entire width of the clamping element 32 and which permits expansion or contraction of the clamping element 32.

An opening 47 for a support section 45 of a clamping stud 10 is provided in the clamping element 42 shown in FIG. 8. The support section 45 has an outer profile 43 which is designed as a quadrilateral with beveled corners. The clamping element 42 has a correspondingly designed inner profile 44, which is slightly larger than the outer profile 43, such that the clamping element 42 is movable relative to the support section 45 in the radial direction relative to the longitudinal center axis 29. The clamping element 42 has a slot 41 which extends over the entire width of the clamping element 42.

Figure 10:
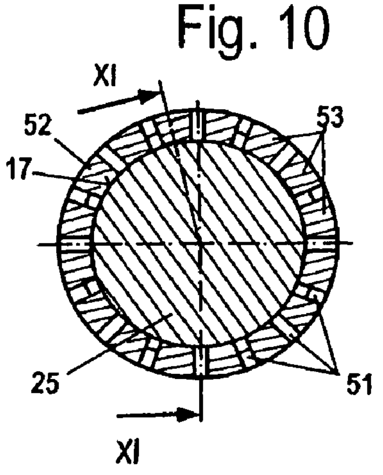
FIG. 10 shows a section along line X-X in FIG. 9.

In the exemplary embodiment of a clamping element 52 shown in FIGS. 9 to 12, a plurality of slots 51 running parallel to the longitudinal centre axis 29 of the opening 17 of the clamping element 52 are provided. The clamping element 52 has a first end face 54, which lies adjacent to the second collar 24, and a second end face 55, which lies adjacent to the collar 11. The slots 51 extend over about ⅔ to ¾ of the width of the clamping element 52. Slots 51 which are adjacent in the circumferential direction open out at opposite end faces 54 and 55, such that a meander-shaped form of the clamping element 52 results. The slots 51 subdivide the clamping element 52 into segments 53 which run parallel to the longitudinal centre axis 29 and which are in each case connected at opposite end faces to adjacent segments 53. As FIG. 10 shows, the clamping element 52 sits tightly on the support section 25. However, clearance may also be provided between the support section 25 and the opening 17.

Figure 11:
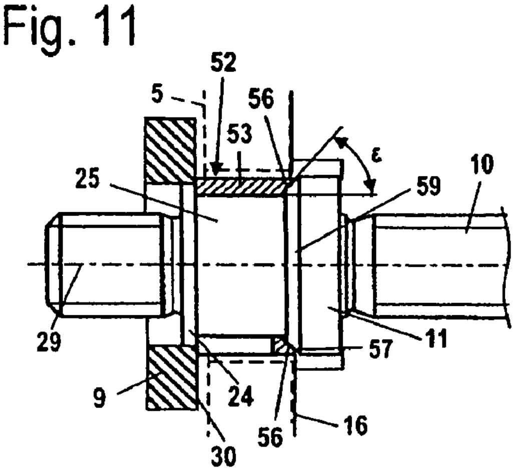
FIG. 11 shows a schematic sectional illustration along line XI-XI in FIG. 10.

As FIG. 11 shows, the collar 11, on its side facing the clamping element 52, has a bearing surface 59 of conical design. The cone in this case becomes smaller toward the side of the chain wheel cover 9. On the side facing the collar 11, the clamping element 52 has a clamping surface 56 which is designed to be rotationally symmetrical relative to the longitudinal center axis 29 and which likewise runs conically. The clamping surface 56 is interrupted by the slots 51. A section of the clamping surface 56 is advantageously formed on each segment 53. In order to center the clamping element 52 and the guide rail 5 in the clamped state, in particular at least two segments 53 have a clamping surface 56. The two segments 53 are in this case arranged in particular opposite one another. The clamping surface 56 encloses with the longitudinal center axis 29 an angle $\epsilon$ which is greater than 0° and less than 90°. The angle $\epsilon$ is advantageously about 20° to about 60°. The angle $\epsilon$ may in this case correspond to the inclination of the bearing surface 59; however, different angles may also be provided. The angle $\epsilon$ is selected in such a way that self-locking between the bearing surface 59 and the clamping surface 56 is avoided.

Figure 12:
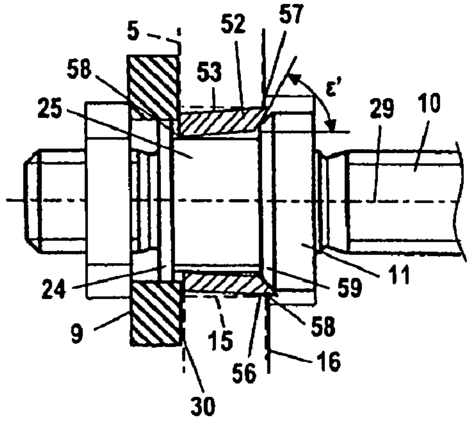
FIG. 12 shows the clamping element from FIG. 11 in the clamped state.

FIG. 12 shows the clamping element 52 in the clamped state. The guide rail 5 lies between the bearing surfaces 16 and 30 and is clamped in place between them. The bearing surface 30 on the sprocket cover 9 has displaced the clamping element 52 in the direction of the collar 11. As a result, the segments 53 have been displaced outward by the bearing surface 59 on the side facing the collar 11. The segments 53 are pressed against the locating opening 15 of the guide rail 5 by the bearing surface 59. This results in an outer clamping region 57, which, interrupted by the slots 51, extends over the entire circumference of the clamping element 52. On the side facing the sprocket cover 9, the clamping element 52 is pressed against the support section 25. In order to ensure that the clamping element 52 does not expand on the side facing the sprocket cover 9, the sprocket cover 9 may likewise be designed to be conical in the region in which the bearing surface 30 interacts with the clamping element 52. In the expanded state, the clamping surface 56 is inclined relative to the longitudinal center axis 29 by an angle $\epsilon'$ which is larger than the angle $\epsilon$. At the region facing the sprocket cover 9, the clamping element 52 bears with an inner clamping region 58 against the support section 25. As a result, the clamping element 52 fixes the guide rail 5 on the support section 25 in the radial direction.

Figure 13:
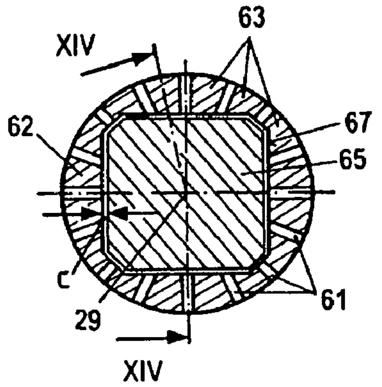
FIG. 13 shows a sectional illustration of an exemplary embodiment of a clamping element on a clamping stud.
Figure 14:
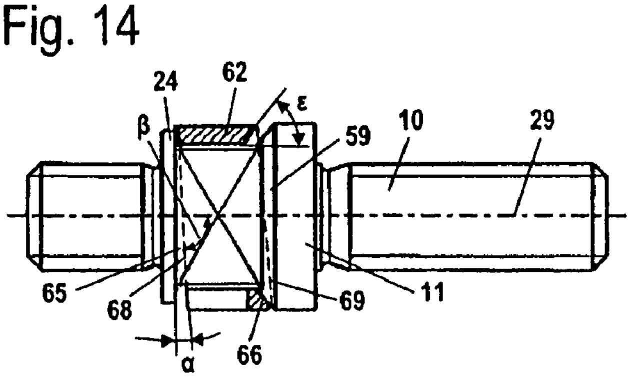
FIG. 14 shows a section along line XIV-XIV in FIG. 13.

Shown in FIGS. 13 and 14 is a further exemplary embodiment of a clamping element 62 in which there is positive locking of the rotary position between the clamping element 62 and a support section 65. The clamping element 62 has an opening 67 which is designed to be essentially quadrilateral, in particular square, with beveled corners. The support section 65 has an outside diameter adapted thereto. The outside diameter of the support section 65 is at each point smaller than the inside diameter of the opening 67, such that a distance c is formed between the clamping element 62 and the support section 65, and this distance c allows a movement of the clamping element 62 relative to the support section 65 in the radial direction relative to the longitudinal center axis 29. The clamping element 62 has a multiplicity of slots 61 which are of a design corresponding to the slots 51 of the clamping element 52 and which subdivide the clamping element 62 into segments 63.

As FIG. 14 shows, the clamping element 62, on its side facing the collar 11, has a clamping surface 66 which is inclined relative to the longitudinal center axis 29 by an angle $\epsilon$. The clamping element 62 has a clamping surface 68 which faces the sprocket cover 9 (not shown in FIG. 14) and, at the opposite end face, a clamping surface 69 which faces the collar 11. The two clamping surfaces 68 and 69 are formed parallel to one another and are inclined relative to the longitudinal center axis 29 by an angle $\beta$ which is less than 90°. Accordingly, this results in an inclination of the clamping surfaces 68 and 69 relative to the associated bearing surfaces at the collar 11 and at the sprocket cover 9 by an angle $\alpha$. When the guide rail is being clamped, the clamping element 62 is first of all tilted, as described with respect to the clamping element 12. During further tightening, the segments 63 can be swung outward. This results in reliable fixing of the guide rail 5.

Figure 15:
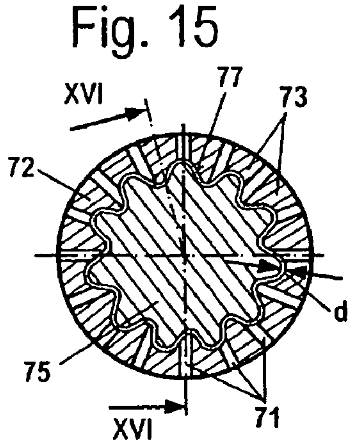
FIG. 15 shows a schematic sectional illustration of an exemplary embodiment of a clamping stud with clamping element arranged thereon.
Figure 16:
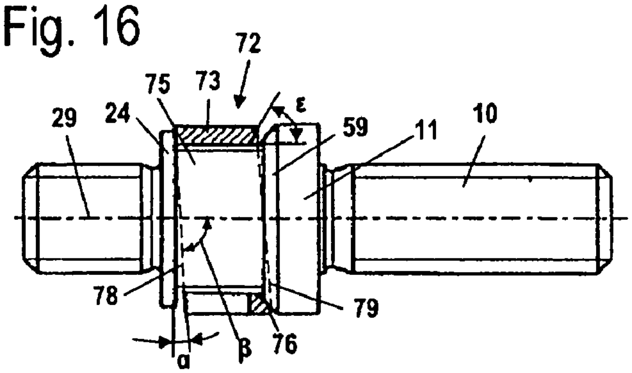
FIG. 16 shows a section along line XVI-XVI in FIG. 15.

Shown in FIGS. 15 and 16 is an exemplary embodiment of a clamping element 72 which essentially corresponds to the clamping element 62 shown in FIGS. 13 and 14. The clamping element 72 has a multiplicity of slots 71 which are of a design corresponding to the slots 51 and which subdivide the clamping element 72 into a multiplicity of segments 73. In the exemplary embodiments, the clamping elements 52, 62 and 72 each have 16 segments. However, another number of segments may also be provided. In order to achieve reliable clamping, at least two segments are advantageously provided. The clamping element 72 has an opening 77, with which the clamping element 72 is arranged on the support section 75. The inner profile of the clamping element 72 is of corrugated design. The outer profile of the support section 75 is of corresponding corrugated design. The two profiles are at a distance d from one another, such that the clamping element 72 is movable relative to the support section 75 in the radial direction. As a result, tilting of the clamping element 72 relative to the support section 75 can be ensured.

As FIG. 16 shows, the clamping element 72 has a clamping surface 76 on the side facing the collar 11, said clamping surface 76 being inclined relative to the longitudinal center axis 29 by an angle $\epsilon$. On the side facing the second collar 24, the clamping element 72 has a clamping surface 78 at its end face, said clamping surface 78 being inclined relative to the longitudinal center axis 29 of the opening 77 by an angle $\beta$ of less than 90°. Accordingly, the clamping surface 78 encloses an angle $\alpha$ of more than 0° with the bearing surface 30 of a sprocket cover 9 (not shown in FIG. 16). Formed at the opposite end face is a clamping surface 79 which is formed parallel to the clamping surface 78 and is inclined relative to the bearing surface 59 of the collar 11 by the angle $\alpha$. To clamp the guide rail 5 in position, the clamping element 72 can thereby be tilted to begin with. The segments 73 are then pressed outward in order to achieve reliable clamping of the guide rail 5.

Figure 17:
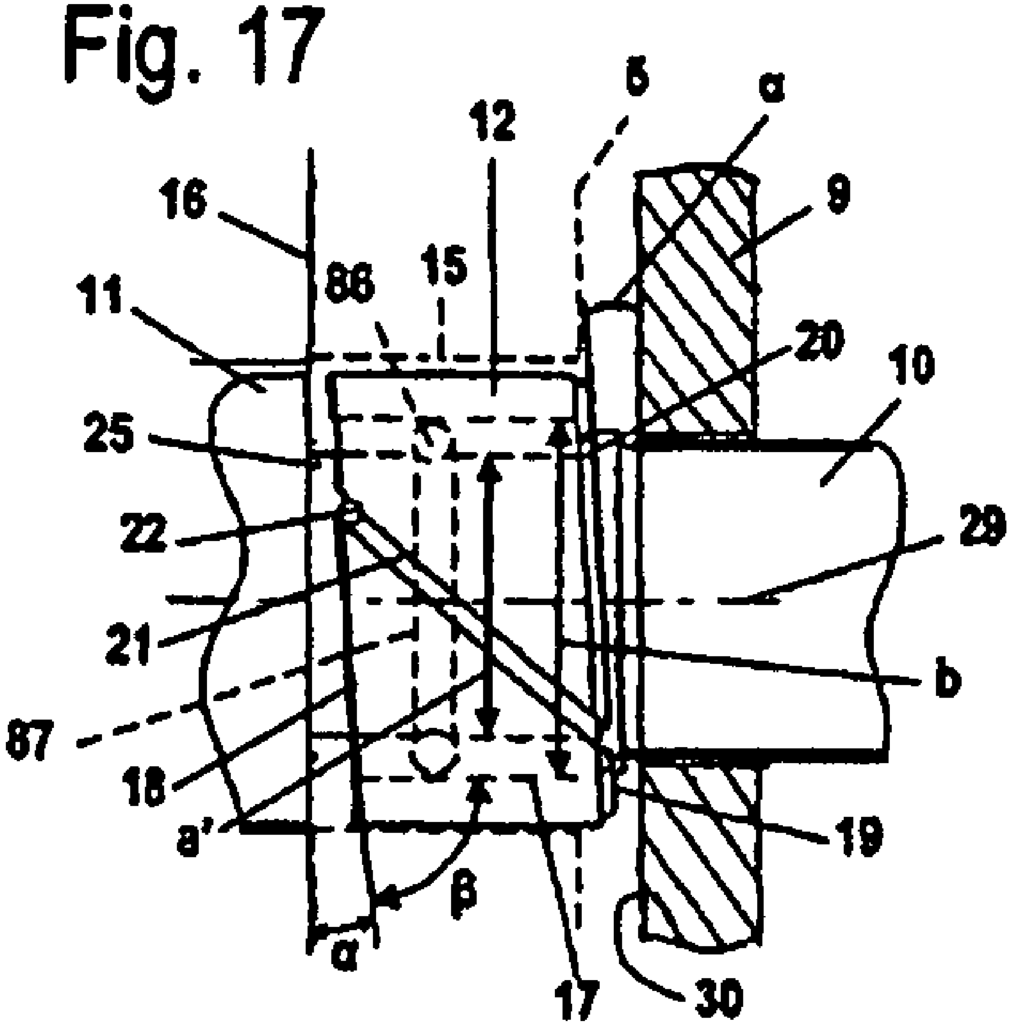
FIG. 17 shows a further exemplary embodiment of the arrangement from FIG. 3.

Shown in FIG. 17 is a further exemplary embodiment of a clamping element 12 which essentially corresponds to the clamping element 12 shown in FIGS. 3 to 5. In the exemplary embodiment according to FIG. 17, an elastic element 86 is provided which compensates for tolerances between the clamping element 12 and the support section 25. The support section 25 has an encircling groove 87 in which the elastic element 86, which may be designed, for example, as a seal, is arranged. In order to provide sufficient space for the elastic element 86, the support section 25 has an outside diameter a' which is reduced compared with the outside diameter a of the support section 25 of the exemplary embodiments from FIGS. 1 to 3. The outside diameter a' of the support section 25 is considerably smaller than the inside diameter b of the opening 17 of the clamping element 12, such that there is sufficient space for the elastic element 86 in the radial direction. The elastic element 86 can only be held on the support section 25 in the unclamped state. However, the elastic element 86 advantageously bears against both the clamping element 12 and the support section 25, as shown in FIG. 17. In the clamped state, the clamping element 12 can be supported directly on the support section 25; however, provision may also be made for the elastic element 86 to be arranged in the clamped state between the clamping element 12 and the support section 25, such that tolerances can be compensated for.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A motorized saw comprising:

a guide rail which is arranged on at least one clamping stud, wherein the guide rail is clampable between two bearing surfaces;

a saw chain which is rotatable disposed on the guide rail, the saw chain being drivable by a drive motor; and a clamping element which is arranged on the clamping stud and in a locating opening of the guide rail, wherein the clamping element fixes the guide rail in at least a radial direction of the clamping stud in a clamped state, and wherein the clamping element has a slot extending over an entire width of the clamping element; wherein the clamping element comprises at least one clamping surface which engages with one of the bearing surfaces in the clamped state, wherein the at least one clamping surface forms an angle (β) of less than 90° with respect to a longitudinal axis of an opening of the clamping element, and wherein, in the clamped state, at least a portion of an outer surface of the clamping element is tilted by a non-zero angle (δ) with respect to a longitudinal axis of the clamping stud and a longitudinal axis of the locating opening.

2. A motorized saw according to claim 1, wherein the opening of the clamping element passes through the clamping element, wherein the clamping stud is arranged in the opening of the clamping element.

3. A motorized saw according to claim 2, wherein an inside diameter of the opening of the clamping element is larger than an associated outside diameter of the clamping stud, wherein a height of the locating opening of the guide rail in a region of the clamping element is larger than an outside diameter of the clamping element.

4. A motorized saw according to claim 1, further comprising a locking device for the clamping element that functions together with the clamping element and the at least one clamping stud.

5. A motorized saw according to claim 4, wherein the locking device effects a positive locking of a rotary position of the clamping element, wherein a cross section of the opening of the clamping element and a cross section of an outside diameter of the at least one clamping stud match one another.

6. A motorized saw according to claim 4, wherein the locking device engages with the clamping element and the at least one clamping stud.

7. A motorized saw according to claim 4, wherein a cross section of the opening of the clamping element and a cross section of an outside diameter of the clamping stud are adapted to one another and effect positive positional locking.

8. A motorized saw according to claim 2, wherein the at least one clamping stud has a collar with an outer diameter greater than an inner diameter of the opening of the clamping element.

9. A motorized saw according to claim 1, wherein an elastic element is arranged between the guide rail and the clamping element.

10. A motorized saw according to claim 1, wherein an elastic element is arranged between the at least one clamping stud and the clamping element.

11. A motorized saw according to claim 2, wherein the clamping element has a plurality of slots which extend in each case over part of a width of the clamping element and which subdivide the clamping element into segments, wherein at least two of the segments interact with the one of the bearing surfaces.

12. A motorized saw according to claim 11, wherein the one of the bearing surfaces is conical.

13. A motorized saw according to claim 1, wherein, when the guide rail is not clamped in place between the two bearing surfaces, the clamping surface and the one of the bearing surfaces form an angle of more than 0°.

14. A motorized saw according to claim 1, further comprising a housing including the two bearing surfaces, wherein the at least one clamping surface of the clamping element engages with the one of the bearing surfaces of the housing in the clamped state.

15. A motorized saw according to claim 1, wherein the non-zero angle (δ) is less than or equal to 5°.

16. A motorized saw according to claim 1, wherein the non-zero angle (δ) is greater than or equal to 2° and less than or equal to 3°.

* * * * *